(12) United States Patent
Bhave et al.

(10) Patent No.: US 9,036,951 B2
(45) Date of Patent: May 19, 2015

(54) SILICON ACOUSTO-OPTIC MODULATOR STRUCTURE AND METHOD

(75) Inventors: Sunil Bhave, Ithaca, NY (US); Suresh Sridaran, Fort Collins, CO (US)

(73) Assignee: CORNELL UNIVERSITY, Ithaca, NY (US)

( * ) Notice: Subject to any disclaimer, the term of this patent is extended or adjusted under 35 U.S.C. 154(b) by 49 days.

(21) Appl. No.: 13/556,617

(22) Filed: Jul. 24, 2012

(65) Prior Publication Data

US 2012/0294564 A1 Nov. 22, 2012

Related U.S. Application Data

(63) Continuation-in-part of application No. PCT/US2011/002211, filed on Jan. 24, 2011.

(60) Provisional application No. 61/298,330, filed on Jan. 26, 2010.

(51) Int. Cl.
*G02F 1/01* (2006.01)
*G02F 1/035* (2006.01)
(Continued)

(52) U.S. Cl.
CPC ............... *G02F 1/335* (2013.01); *G02F 1/113* (2013.01); *G02F 1/125* (2013.01); *G02B 26/02* (2013.01); *G02F 2201/17* (2013.01);
(Continued)

(58) Field of Classification Search
CPC ......... G02F 1/0128; G02F 1/035; G02F 1/31; G02F 1/313; G02F 1/33; G02F 1/335
USPC .............................................. 385/1, 2, 4, 7, 8
See application file for complete search history.

(56) References Cited

U.S. PATENT DOCUMENTS 6,370,167 B1 4/2002 Donati et al.
6,665,476 B2 * 12/2003 Braun et al. .................... 385/50
(Continued)

OTHER PUBLICATIONS

Groblacher et al; Observation of Strong Coupling Between a Micromechanical Resonator and an Optical Cavity Field; vol. 460/6 Aug. 2009; doi:10.1038/nature08171; Macmillan Publishers Limited; 724-727.
Hsu, Wan-Thai; Recent Progress in Silicon MEMS Oscillators; 40th Annual Precise Time and Time Interval (PTTI) Meeting; 2008; 135-146.
(Continued)

*Primary Examiner* — Ryan Lepisto
(74) *Attorney, Agent, or Firm* — William Greener; Alek Szecsy; Bond, Schoeneck & King, PLLC

(57) ABSTRACT

An electro-optic structure, which may comprise an acousto-optic modulator for use in an opto-acoustic oscillator, comprises a plurality of rigidly connected resonator core components located movably separated over a substrate and anchored to the substrate at an anchor point. An actuator electrode is located separated from a first one of the rigidly connected resonator core components and an optical waveguide is located separated from a second one of the rigidly connected resonator core components. Radio frequency and direct current actuation of the actuator electrode provides a mechanical vibration in the first rigidly connected resonator core component that is mechanically coupled to the second rigidly connected resonator core component which serves to optically modulate light transported through the wave guide. Reverse operation is also contemplated. Embodiments also contemplate a third rigidly connected resonator core component as a radiation pressure driven detector. Further contemplated are related fabrication and operation methods.

36 Claims, 10 Drawing Sheets

(51) Int. Cl.
*G02F 1/295* (2006.01)
*G02F 1/335* (2006.01)
*G02B 26/02* (2006.01)
*G02B 6/12* (2006.01)
*G02F 1/11* (2006.01)
*G02F 1/125* (2006.01)

(52) U.S. Cl.
CPC ........ *G02F 2201/20* (2013.01); *G02F 2201/58* (2013.01); *G02F 2202/105* (2013.01); *G02F 2203/15* (2013.01); *G02B 6/12007* (2013.01)

(56) References Cited

U.S. PATENT DOCUMENTS

| | | | |
|---|---|---|---|
| 7,385,749 | B2 | 6/2008 | Pannell et al. |
| 7,430,344 | B2 | 9/2008 | Miyata et al. |
| 7,724,179 | B2 | 5/2010 | Williams et al. |
| 7,791,424 | B2 | 9/2010 | Sutardja |
| 7,812,502 | B2 | 10/2010 | Zalalutdinov et al. |
| 2007/0171513 | A1 | 7/2007 | Pannell et al. |
| 2007/0200648 | A1 | 8/2007 | Reichenbach et al. |

OTHER PUBLICATIONS

Khouly et al.; A MEMS Disk Resonator-Based Oscillator; 1-4244-0765-06/06; 2006; IEEE; 75-78.

Matsko et al.; Surface-Acoustic Wave Opto-Mechanical Oscillator; 978-1-4244-6401-2/10; 2010; IEEE; 183-188.

Sridaran et al.; Silicon RF MEMS Based Optical Modulator; OxideMEMS Lab; Cornell University, Ithaca, NY, USA; 2010.

Sridaran et al.; Silicon RF MEMS Based Optical Modulator; 978-1-55752-890-2/10 2010; IEEE.

Rokhsari et al.; Radiation-Pressure-Driven Micro-Mechanical Oscillator; Jul. 11, 2005; vol. 13, No. 14; Optics Express; 5293-5301.

Carmon et al.; Temporal Behavior of Radiation-Pressure-Induced Vibrations of an Optical Microcavity Phonon Mode;0031-9007/05/94(22)/223902(4); 2005; The American Physical Society; 223902-1-223902-4.

Cha, Geon Sook; International Search Report and Written Opinion; Korean Intellectual Property Office; Nov. 25, 2011.

Sunil A. Bhave et al.; Silicon Monolithic Acousto-Optic Modulator;978-1-4244-5763-2/10; 2010; IEEE; 835-838.

* cited by examiner

SILICON ACOUSTO-OPTIC MODULATOR STRUCTURE AND METHOD

CROSS-REFERENCE TO RELATED APPLICATION

This application is a Continuation-in-Part (CIP) bypass application from International Application PCT/US 2011/22211, filed 24 Jan. 2011, which in turn is related to, and derives priority from, U.S. Provisional Patent Application Ser. No. 61/298,330, filed 26 Jan. 2010, and titled "Silicon Opto-acoustic Oscillator Apparatus and Method," the content of which is incorporated herein fully by reference.

STATEMENT OF GOVERNMENT INTEREST

This work was supported by the National Science Foundation under Cornell University Account Number E70-8345. The U.S. Government has rights in this invention.

BACKGROUND

1. Field of the Invention

The invention relates generally to optic structures and optic devices. More particularly, the invention relates to acousto-optic structures and acousto-optic devices.

2. Description of the Related Art

Commercially available acousto-optic modulators often operate by releasing a traveling acoustic wave from an inter-digitated transducer (IDT) into an acousto-optically active medium, thereby creating a modulated refractive index in the acousto-optically active medium. Incident light is diffracted and frequency shifted from this modulated refractive index region and can be processed depending upon an output direction. To shrink the acousto-optic modulator to chip-scale size, structures to convert acoustic phase modulation into intensity phase modulation, such as a Mach-Zehnder interferometer or a photonic microcavity, have been demonstrated.

Since optical signal propagation characteristics and optical signal switching characteristics are important considerations within advanced data processing systems, desirable are additional acousto-optic modulator structures and their methods of fabrication.

SUMMARY OF THE INVENTION

Embodiments include an electro-optic structure, such as an acousto-optic modulator structure, a method for fabricating the electro-optic structure, such as the acousto-optic modulator structure and a method for operating an electro-optic device that results from the electro-optic structure, such as the acousto-optic modulator structure.

An electro-optic structure in accordance with the embodiments includes: (1) an electro-mechanical resonator; integrated with at least one of; (2)(a) a photonic resonator; and (2)(b) a radiation pressure driven detector. The foregoing integrated resonators may be located upon and formed using a single silicon-on-insulator substrate, although such is not necessarily a limitation of the embodiments.

An exemplary non-limiting electro-optic structure in accordance with the embodiments includes at least one substrate. The electro-optic structure also includes a plurality of rigidly connected resonator core components located movably suspended at least in-part over the at least one substrate and anchored to the at least one substrate at an anchor point. The electro-optic structure also includes at least one actuator electrode located over the at least one substrate and operatively spaced from a first one of the plurality of rigidly connected resonator core components. The electro-optic structure also includes an optical waveguide located over the at least one substrate and operatively spaced from a second one of the plurality of rigidly connected resonator core components.

Another exemplary non-limiting electro-optic structure in accordance with the embodiments includes at least one substrate. The electro-optic structure also includes at least three rigidly connected resonator core components located suspended at least in-part over the at least one substrate and anchored to the at least one substrate at an anchor point. The electro-optic structure also includes at least one actuator electrode located over the at least one substrate and operatively spaced from a first one of the plurality of rigidly connected resonator core components. The electro-optic structure also includes a first waveguide located over the substrate and operatively spaced from a second one of the plurality of rigidly connected resonator core components. The structure also includes a second waveguide located over the substrate and operatively spaced from a third one of the plurality of rigidly connected resonator core components, where the first one of the plurality of rigidly connected resonator core components is interposed between the second one of the plurality of rigidly connected resonator core components and the third one of the plurality of rigidly connected resonator core components.

Also considered within the context of non-limiting embodiments are opto-acoustic oscillators that include the foregoing electro-optic structures that may comprise acousto-optic modulator structures.

An exemplary non-limiting method for fabricating an electro-optic structure in accordance with the embodiments includes patterning a surface semiconductor layer within a silicon-on-insulator substrate to form upon a buried oxide layer a plurality of rigidly connected resonator core components, at least one actuator electrode operatively spaced from a first one of the plurality of rigidly connected resonator core components and an optical waveguide operatively spaced from a second one of the plurality of rigidly connected resonator core components. The method also includes etching portions of the buried oxide layer to provide the plurality of rigidly connected resonator core components separated from and movably suspended at least in-part over the substrate, but anchored to the substrate.

Exemplary non-limiting methods for operating an electro-optic device in accordance with the embodiments provide for use of an exemplary non-limiting structure in accordance with the embodiments for either: (1) modulating an optical signal within a waveguide within the structure by introducing an electrical signal into an actuator electrode within the structure; or (2) introducing a modulated optical signal into the waveguide within the structure and measuring an electrical signal at the actuator electrode within the structure.

Within the embodiments and the claimed invention with respect to the terminology of "operatively spaced" component structures of an electro-optic structure, such operative spacing is intended as a spacing that provides an operational electro-optic device (i.e., such as an acousto-optic modulator device) from an electro-optic structure (i.e., such as an acousto-optic modulator structure) in accordance with the embodiments when the electro-optic structure in accordance with the embodiments is electro-optically actuated to provide the electro-optic device. Thus, the description that follows also intends that an electro-optic structure or acousto-optic modulator structure in accordance with the embodiments once electro-optically actuated may be described as an electro-optic device or an acousto-optic modulator device.

BRIEF DESCRIPTION OF THE DRAWINGS

The objects, features and advantages of the embodiments are understood within the context of the Detailed Description of the Embodiments, as set forth below. The Detailed Description of the Embodiments is understood within the context of the accompanying drawings, that form a material part of this disclosure, wherein.

DETAILED DESCRIPTION OF THE EMBODIMENTS

Figure 1:
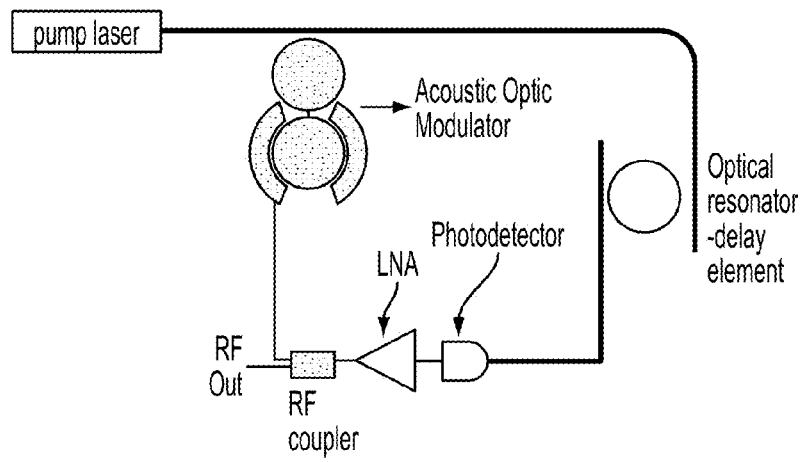
FIG. 1 shows a schematic diagram of an opto-electronic oscillator that comprises an acousto-optic modulator structure in accordance with a first embodiment for selecting a radio frequency signal and up-converting the radio frequency signal into an optical frequency signal.

The embodiments, which include an electro-optic structure that may comprise an acousto-optic modulator structure, a method for fabricating the electro-optic structure that may comprise the acousto-optic modulator structure and a method for operating an electro-optic device that may result from the electro-optic structure that may comprise the acousto-optic modulator structure, are understood within the context of the description set forth below. The description set forth below is understood within the context of the drawings described above. Since the drawings are intended for illustrative purposes, the drawings are not necessarily drawn to scale.

The embodiments are predicated upon a scheme of electro-optic modulation and acousto-optic modulation that utilizes: (1) a radio frequency powered electro-mechanical resonator for exciting mechanical motion in a first movable core component within a first electro-mechanical resonator; where (2) the mechanical motion in the first movable core component within the first electro-mechanical resonator is rigidly mechanically coupled to a second movable core component within a second resonator that is used to modify and modulate intensity transmission characteristics of an optical signal within an optical waveguide operatively coupled to the second movable core component within the second resonator. Thus, the second movable core component comprises a photonic resonator that is rigidly integrated with the first movable core component that comprises the electro-mechanical resonator.

Since significant mechanical motion in the electro-mechanical resonator core component is typically excited when a radio frequency and direct current electrical drive for the electro-mechanical resonator is at a resonant frequency, the modulator in accordance with the embodiments is typically anticipated to be narrowband. A particular application for the electro-optic modulator and the acousto-optic modulator in accordance with the embodiments is the monolithic integration of an opto-electronic oscillator within a silicon substrate.

Although the disclosure that follows illustrates the embodiments within the context of a movable electro-mechanical core component within an electro-mechanical resonator rigidly connected to a movable photonic core component within an optical resonator, where each of the movable electro-mechanical core component and the movable optical core component comprises one of a circular disk component and a circular ring component, the embodiments in general are not intended to be so limited. Rather each of a movable electro-mechanical core component within an electro-mechanical resonator rigidly connected with a movable photonic core component within a photonic resonator in accordance with the embodiments may comprise a movable core component including but not limited to a circular disk or a circular ring, an elliptical disk or an elliptical ring, a regular or irregular polygonal disk or ring, an alternative regular or irregular disk or ring shape, or a linear resonator cavity formed by Bragg reflectors.

Opto-electronic oscillators often have superior phase-noise performance characteristics in comparison with traditional quartz and acoustic-MEMS oscillators that operate in the 1-30 GHz range. Unlike crystal oscillators whose phase-noise performance characteristics are limited by an fQ product of a resonator, the phase-noise performance characteristics of an opto-electronic oscillator is only dependent on laser source output characteristics and optical delay element characteristics.

However, opto-electronic oscillators are often hand-assembled using discrete components that may include, but are not necessarily limited to, a surface acoustic wave (SAW) filter for frequency selection followed by a Mach-Zehnder modulator (MZM) for up-conversion. Within these more traditional opto-electronic oscillators, a signal chain includes electrical→acoustic→filter→electrical→impedance-match→electrical→optical progression. A silicon electro-optic modulator or acousto-optic modulator in accordance with the embodiments monolithically integrates the signal processing into one device by converting a signal from electrical→acoustic-filter→optical with minimal inefficiency. Moreover, a silicon electro-optic modulator or acousto-optic modulator in accordance with the embodiments may be fabricated with less than about 100 μm² footprint and zero direct current power consumption.

I. First Embodiment

1. General Considerations

FIG. 1 shows a schematic diagram of an opto-electronic oscillator that includes an acousto-optic modulator for selecting and up-converting a radio frequency signal into an optical signal. The acousto-optic modulator is located interposed between a pump laser source and an optical resonator delay element. Output from the optical resonator delay element is directed to a photodetector, a low noise amplifier (LNA) and a radio frequency coupler all of which are in series, which provides a feedback loop to the acousto-optic modulator, as well as a radio frequency output.

2. Principle of Operation

Figure 2:
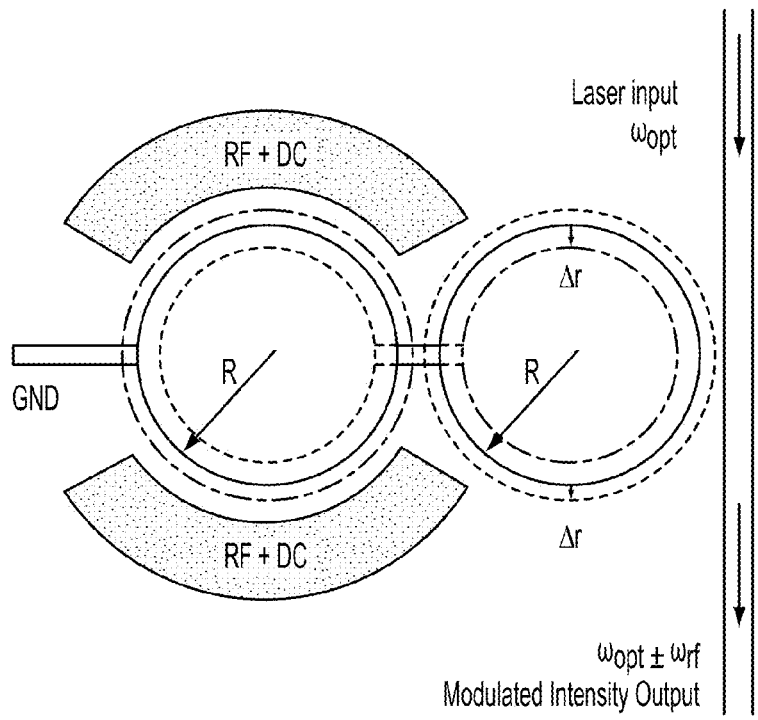
FIG. 2 shows a schematic plan-view diagram of an acousto-optic modulator structure in accordance with the first embodiment.

A schematic diagram of an acousto-optic modulator in accordance with the embodiments is illustrated in FIG. 2. Such an acousto-optic modulator includes two disk resonators mechanically coupled to (i.e., connected to) each other by a mechanical coupling beam that is integral with and interposed between the two disk resonators. A first disk resonator with the radio frequency and direct current (RF and DC) electrodes (i.e., the disk resonator on the left) acts as an electrical to mechanical (i.e., electro-mechanical) transducer. By coupling the mechanical vibrations within this electro-mechanical disk resonator to a second photonic disk resonator (i.e., the disk resonator on the right) through the mechanical coupling beam, a changing effective radius of the photonic disk resonator causes the optical resonant wavelength within the optical resonator portion of the acousto-optic modulator to shift back and forth. For a fixed input laser wavelength biased around the optical resonance wavelength, the shifting of the optical resonance leads to intensity modulation at the output.

Within the acousto-optic modulator whose schematic planview diagram is illustrated in FIG. 2, each of the electro-mechanical disk resonator and the optical disk resonator has a disk radius R from about 5 to about 30 microns, and a change in radius Δr of +/− about 0.1 to about 1 nanometers. In addition, the electro-mechanical disk resonator and the optical disk resonator are separated by and connected to the mechanical coupling beam of length and width as discussed further below.

Moreover, the radio frequency and direct current electrodes within the electro-mechanical disk resonator are separated from the disk within the electro-mechanical disk resonator by a distance from about 50 to about 250 nanometers. Similarly, the waveguide at the far right of FIG. 2 has a linewidth from about 300 to about 500 nanometers and is spaced from the disk within the optical disk resonator by a distance from about 50 to about 400 nanometers. Finally, the electro-mechanical disk resonator includes a ground connection at the left of the disk within the electro-mechanical disk resonator and opposite the mechanical coupling beam that connects and separates the disk within the electro-mechanical disk resonator and the disk within the optical disk resonator. This ground connection provides a mechanical support beam of length about 1 to about 10 microns that further serves as an anchor point to a substrate upon and over which is located and formed the acousto-optic modulator which comprises the electro-mechanical disk resonator and the optical disk resonator as illustrated in FIG. 2.

As will be illustrated in a schematic diagram that follows, each of the rigidly connected electro-mechanically actuated disk and optical disk that is illustrated in FIG. 2 is separated from and suspended over the substrate by a distance from about 1 to about 3 microns.

3. Photonic Resonator

The optical resonator in the acousto-optic modulator as illustrated in FIG. 2 is a whispering gallery disk resonator. The light signal from the waveguide at the right of FIG. 2 is dropped at the whispering gallery disk resonator when the wavelength corresponds with the resonance wavelength. This resonance occurs when the phase added in one round trip of the incident light around the disk is an integral multiple of 2Π, and this relationship may be represented by equation:

$$m \lambda_o = 2\Pi R n_{eff} \quad (1)$$

where m is an integer, $\lambda_o$ is free space wavelength at resonance, R is the radius of the disk and $n_{eff}$ is the effective index of the mode in the radius of the disk obtained by solving Maxwell's equation with appropriate boundary conditions.

Figure 3:
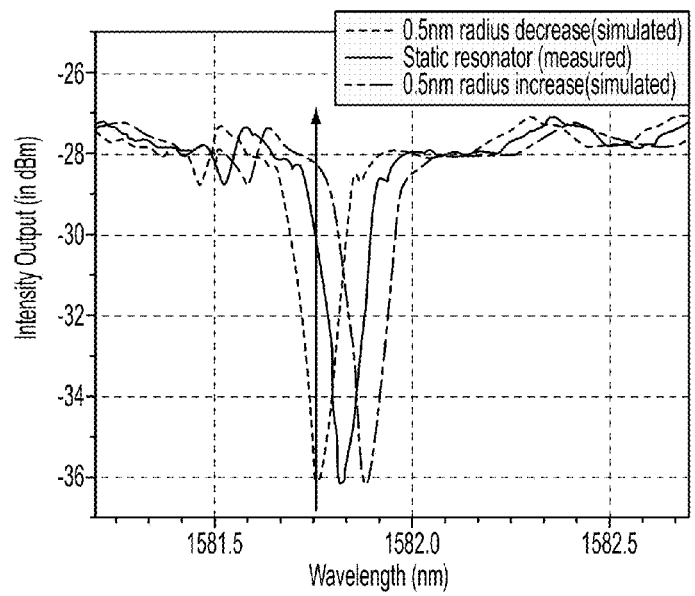
FIG. 3 shows a graph of Intensity versus Wavelength for a static photonic resonator with an optical Q value of 12,000 in accordance with the first embodiment.

The transmission spectrum dip observed at the output of the waveguide is a Lorentzian centered at the resonant wavelength $\lambda_o$ as shown in FIG. 3. The optical quality factor ($Q_{optical}$) at critical coupling is related to full-width at half maximum (FWHM) by $Q_{optical} = \lambda_o/\text{FWHM}$. The depth of the dip is governed by the rate of energy decay of the resonator by absorption and scattering, and the rate of energy coupling from the waveguide into the optical disk resonator.

The silicon acousto-optic modulator is a photonic resonator based modulator similar to electro-optic modulators that have been demonstrated. In many electro-optic modulators, an effective index is changed by charge injection to obtain a resonance wavelength shift. In an acousto-optic modulator, the radial vibrations change the radius by a small displacement Δr. This in turn changes the resonance wavelength to:

$$m(\lambda_o + \Delta\lambda) = 2\Pi(R+\Delta R)n_{eff} \quad (2)$$

which simplifies to:

$$\Delta\lambda/\lambda_o = \Delta R/R \quad (3)$$

The expected shift in the resonance wavelength for displacements of 0.5 nm for a 10 μm disk with resonance at 1581.76 nm is approximately 80 μm and is shown in FIG. 3. It is observed that if a laser input is initially biased around the optical resonance, then there is a modulation of the intensity at the output.

4. Mechanical Resonator

The radial contour mode resonator is excited by using an air gap capacitive electrostatic transduction. The frequency of operation of the disk is obtained by solving the equation:

$$\delta J_o(\delta)/J_1(\delta)=1-\sigma \quad (4)$$

where $\delta = \omega_o R \sqrt{\rho(1-\sigma^2)/E}$, $\omega_o$ is the angular resonant frequency, R is the radius of the disk. $\rho$, E and $\sigma$ are the density, Young's modulus and Poisson's ratio of silicon respectively. $J_0$ and $J_1$ are Bessel functions of the first kind.

The embodiments utilize separate disks for the mechanical resonator and the photonic resonator to inhibit the distortion and attenuation of the optical mode travelling in the photonic resonator from the free-electron charges on the MEMS resonator and the actuation electrodes. Further isolation is achieved by selectively implanting only the MEMS resonator (i.e., with either an n-type or a p-type dopant at a concentration from about $10^{17}$ to about $10^{20}$ dopant atoms per cubic centimeter) while keeping the photonic resonator and waveguide region undoped.

The coupling beam between the two disks enables strong mechanical interaction and connection between the two resonators. The scattering loss from the coupling beam is kept to a minimum by using a small beam width (i.e., a vertical dimension of the coupling beam as illustrated in FIG. 2) of about 0.5 μm that separates and connects the two disks. To prevent mass loading and additional resonances, the coupling beam length (i.e., a horizontal dimension of the coupling beam as illustrated in FIG. 2) needs to be half wavelength at the resonance. This however turns out to be too long, and a value of 1.5 μm (or alternatively within a range from about 1 to about 3 microns) is selected, which is much less than the quarter wavelength at 257 MHz.

5. Fabrication Methodology

Figure 4:
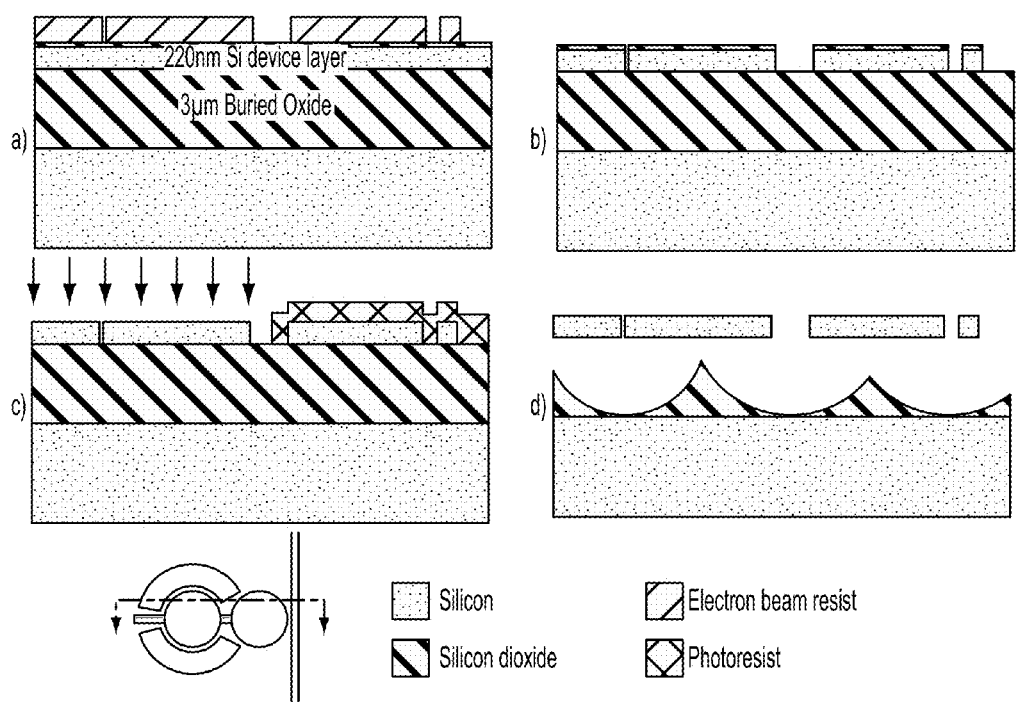
FIG. 4 shows a series of process flow diagrams illustrating the results of progressive process steps in fabricating an acousto-optic modulator structure in accordance with the first embodiment.

The acousto-optic modulator in accordance with the embodiments was fabricated using a three mask process on a custom "photonic-SOI" wafer (i.e., undoped 250 nm device layer for low optical loss and 3 μm thick buried oxide for isolation of the waveguides on device layer from the silicon substrate). The top silicon was thermally oxidized to obtain a thin oxide hard mask layer and a silicon device layer thickness of 220 nm as is illustrated in FIG. 4a. Ma-N 2403 electron beam resist (or alternative operational resist) was spun on top of the oxide and patterned using electron beam lithography as is also illustrated in FIG. 4a.

The patterns were transferred into the oxide using a trifluoromethane/oxygen based reactive ion etch and then into the silicon device layer using a chlorine based reactive ion etch to define the modulator, waveguides and bond-pads as is illustrated in FIG. 4b.

A second resist mask was used to open implant windows to dope the MEMS resonator, electrodes and bond pads with boron ions as is illustrated in FIG. 4c.

Release windows (i.e., using a third resist mask) were then patterned near the modulator followed by a timed release etch in buffered oxide etchant to undercut the devices as is illustrated in FIG. 4d. The samples were then dried using a critical point dryer to prevent stiction.

Figure 5A:
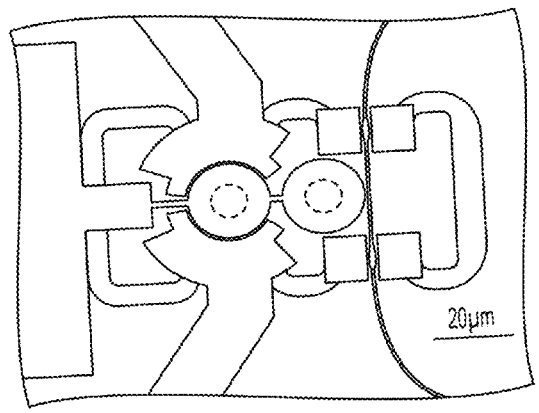
FIG. 5A shows a top-down view optical microscopy image of an acousto-optic modulator structure in accordance with the first embodiment.
Figure 5B:
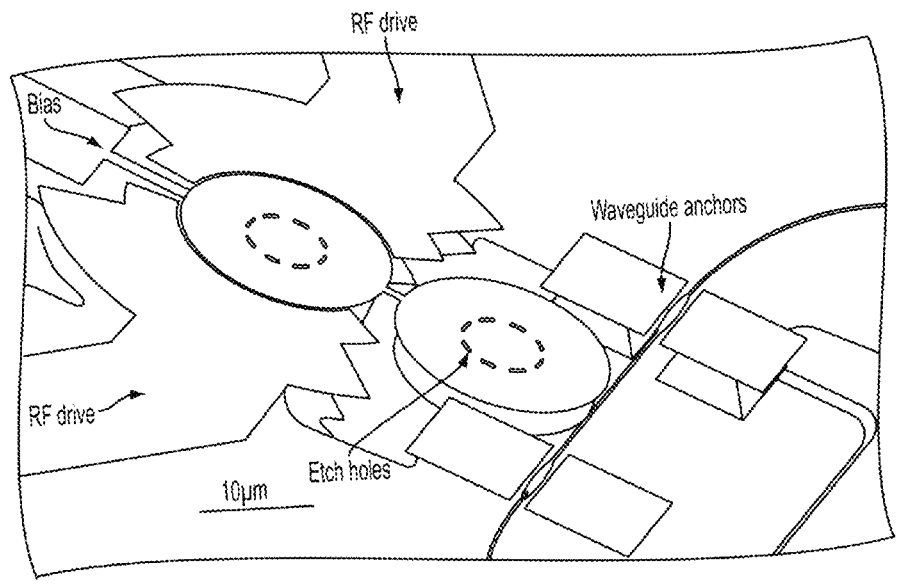
FIG. 5B and FIG. 5C show a pair of perspective view scanning electron microscopy images of an acousto-optic modulator structure in accordance with the first embodiment.
Figure 5C:
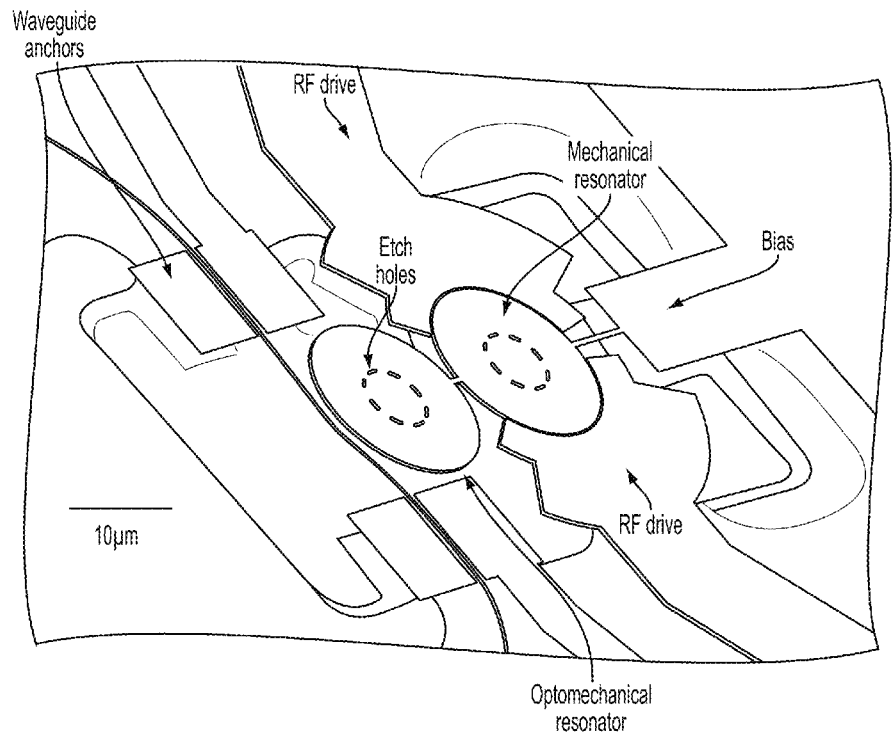

A top down optical microscopy image of a resulting acousto-optic modulator structure is shown in FIG. 5A. A pair of complementary isometric view scanning electron microscopy images of the resulting acousto-optic modulator structure is illustrated in FIG. 5B and FIG. 5C, with individual structures suitable labeled. As is illustrated within the foregoing figures, the terminal support and anchoring beam, the MEMS resonator disk, the connector beam and the optical resonator disk are planar and linearly connected.

6. Experimental Setup

To measure the optical resonance characteristics of an acousto-optic modulator device in accordance with the embodiments, light from a tunable laser was coupled into a waveguide, in conjunction with a cleaved optical fiber end and a grating coupler. The light output from the device was recollected from an output grating into a cleaved fiber and sent to a photodiode. A transmission spectrum similar to that shown in FIG. 3 was obtained by sweeping the tunable laser and collecting the output of the photodiode. An optical Q of 30000 was obtained for resonance at 1552.425 nm and an extinction of 12 dB. The power input from the laser was 5 dBm and the output power level of optical resonance was −13 dBm.

Figure 6:
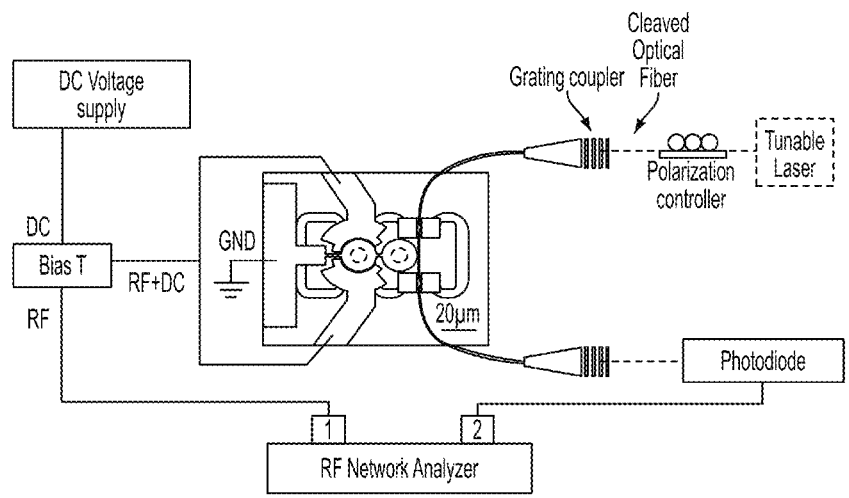
FIG. 6 shows a schematic diagram of an experimental apparatus for characterizing an acousto-optic modulator device in accordance with the first embodiment.

The response of the acousto-optic modulator as described above was observed with the measurement apparatus shown in FIG. 6. The tunable laser was fixed at the 3 dB point of the optical resonance. Port 1 of a network analyzer (the RF source) was connected via a bias-T to the electrodes of the mechanical resonator. The high speed photodiode was connected to port 2 of the network analyzer to observe the response of the modulator at the RF frequency excited by port 1. The photodiode generated a voltage proportional to the optical power input given by the conversion gain of the detector. The gain of the photodiode was 9000 V/W at 1583 nm. The RF input from port 1 was swept and transmission plots (S21) measured.

7. Results

Figure 7:
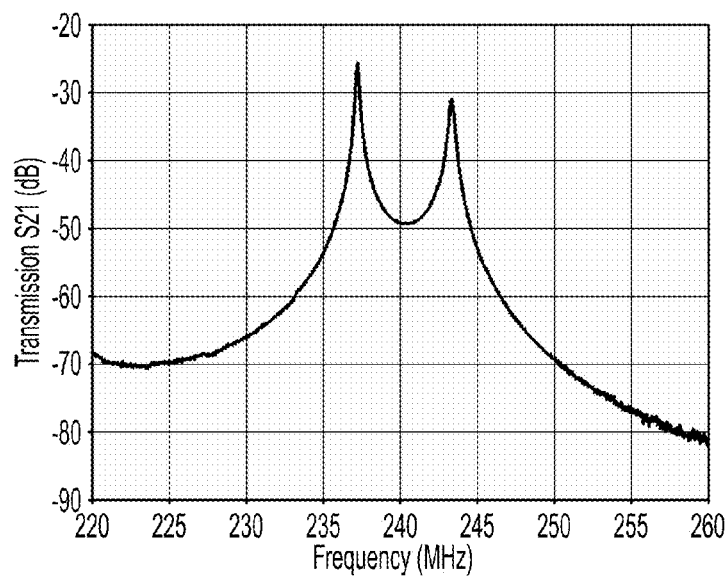
FIG. 7 shows a Transmission versus Frequency spectrum of an acousto-optic modulator device in accordance with the first embodiment.

The MEMS resonator was actuated by applying 0 dBm radio frequency power over the frequency range from 220 MHz to 260 MHz along with a 20 V DC bias. The optical modulation at the mechanical resonant frequency is seen as a peak in the S21 plot of the network analyzer as shown in FIG. 7. The data shows that the modulation occurs only when the electrical input to the device is around the mechanical resonant frequency of the device. The response shows the presence of two modes of vibration at 237.19 Mhz and 243.32 Mhz due to the splitting of the mechanical mode due to the coupling spring. The mode at 237.19 MHz has a quality factor of 1000 in air. The bandwidth of the modulator is given by the ratio of operating frequency to the mechanical quality factor of the resonator. For a quality factor of 1000 in air, the bandwidth of the modulator is 237 kHz.

8. Radiation Pressure-Driven Acousto-Optic Detector

Conventional silicon photonics use germanium or III-V detectors for measuring light intensity. In concert with the foregoing embodiments, additionally proposed is a direct transduction of the modulated light signal into mechanical motion in silicon, without the need for exotic materials.

Figure 8:
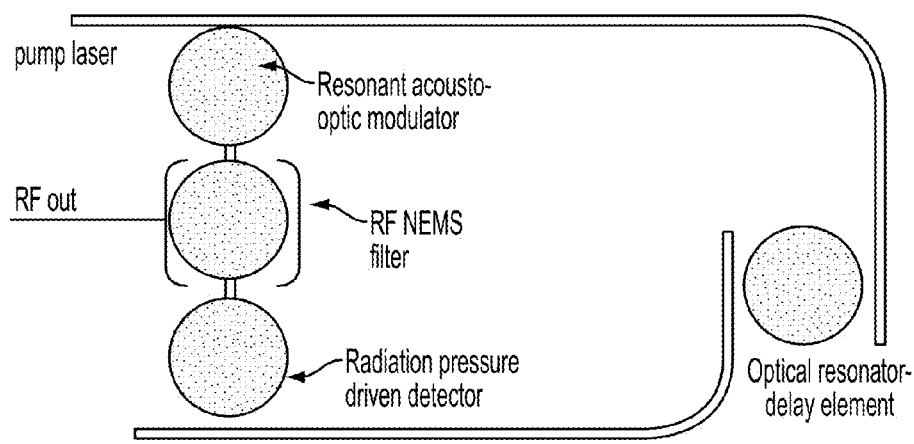
FIG. 8 shows a schematic diagram of an acousto-optic oscillator in accordance with the first embodiment that further comprises a radiation pressure driven opto-acoustic detector.

Transduction of an optical signal into a mechanical resonance in a high Q optical resonator has recently been reported (see, e.g., Carmon et al., Phy. Rev. Lett. 94, 223902 (2005) and Rokhsari et al., Optics Express, 13 (14), 5293 (11 Jul. 2005)). FIG. 8 shows a schematic diagram of such an opto-electronic oscillator structure. Within FIG. 8, a radiation pressure driven detector is used to replace the photodetector, low noise amplifier and radio frequency coupler that are illustrated in FIG. 1.

Thus, FIG. 8 illustrates an opto-electronic oscillator structure that includes both an acousto-optic modulator and a radiation pressure driven detector. Within FIG. 8, the radiation pressure driven detector is intended to operate in a reverse fashion of the acousto-optic modulator (i.e., the radiation pressure driven detector receives as an input a modulated optical signal and converts the modulated optical signal into an electrical signal). Such an integrated acousto-optic modulator and radiation pressure driven detector in accordance with FIG. 8 thus avoids a need for specific additional electrical circuitry that is fed from the radio frequency and direct current electrodes within the acousto-optic modulator.

FIG. 8 adds an additional mechanically interconnected disk within an acousto-optic modulator within an opto-acoustic oscillator in comparison with the opto-acoustic oscillator that is illustrated in FIG. 1. Although not specifically illustrated in FIG. 8, such a radiation pressure driven detector disk may serve as an anchor point to a substrate under circumstances where such a radiation pressure driven detector disk is connected to the substrate through use of a cylindrical pedestal which is preferably nominally uniformly physically overlapped by the radiation pressure driven detector disk (i.e., such physical overlap allows for the foregoing optical signal to mechanical signal transduction). A general theoretical analysis of performance of such a device is as follows.

The radiation pressure forces the disk to expand with radial motion governed by:

$$mr''(t)+br'(t)+kr(t)=F_{rp}=2\int|A_{res}(t)|^2 n_s/c \quad (5)$$

where r(t) is the effective radial displacement, m is the effective disk mass, b is the mechanical dissipation, k is effective spring constant and $F_{rp}$ is the horizontal force applied by action of radiation pressure.

Thus, for resonators fabricated within the context of the foregoing reference to Carmon et al., a force generated is about 1 micro-newton as the power in the resonator reaches about 30 watts.

Figure 9:
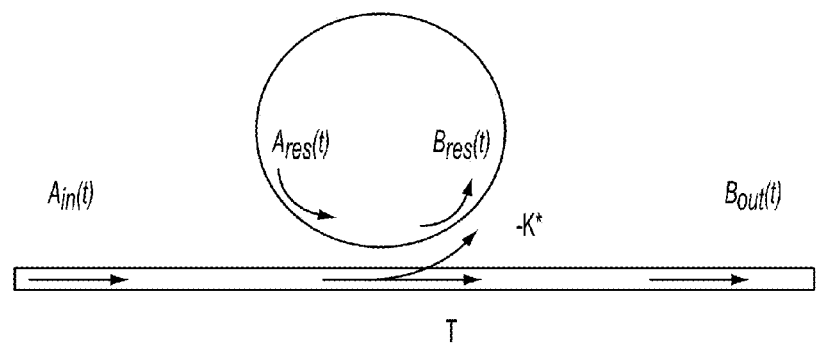
FIG. 9 shows a schematic diagram illustrating in further detail additional aspects of the radiation pressure driven opto-acoustic detector in accordance with the first embodiment as illustrated in FIG. 8.

In turn, the harmonic motion of the disk modulates the field Ares within the optical resonator, is defined by:

$$dA_{res}(r,t)/dt+((1-T^*/\tau_0)+(\alpha c/n_s)+(r(t)/R)A_{res}(r,t))=K^*c\,A_{in}(t)/n_s 2\Pi R \quad (6)$$

where: (1) Ain(t) is optical field amplitude normalized such that $|Ain(t)|^2$ is the input optical power to the optical resonator; (2) a is the loss per unit length within the resonator; (3) c is the velocity of light; (4) $n_s$ the effective refractive index of the resonator; (5) T and K are the transmission and coupling coefficients of the coupler and T* and K* are their complex conjugate; (6) $\tau_0$ is the round trip travel time for the light in the resonator; (7) R is the radius of the optical resonator; and (8) r(t) is the effective radial displacement, in accordance with the definitions provided in FIG. 9.

This optical pressure effect was confirmed in the case of a constant amplitude input $A_{in}$. In the case of the acousto-optic oscillator, $A_{in}$ for the detector is the modulated optical output from the disk in the modulator. The modulation frequency is chosen near the mechanical resonant frequency $\omega_{mech}$ of the detector. The amplitude variation and the phase information of the modulated $A_{in}$ can be transferred to acoustic vibrations in the detection disk according to equation 5 and equation 6. It is proposed to derive analytically the opto-mechanical transduction mechanism in the presence of a modulated light source. The proposed configuration has been solved numerically and enables phase locking of the detector disk to the acousto-optic modulator, providing stable feedback for the oscillator. Thus, the opto-acoustic oscillator as illustrated in FIG. 8 includes an all-silicon, zero-electrical-power detector with integrated filtering within the context of an acousto-optic modulator.

The embodiments also contemplate that a radiation pressure driven detector in conjunction with a micro-electro-mechanical-system (MEMS) disk resonator absent an optical disk resonator (i.e., the bottom two disks at the left hand side of FIG. 8, but not the top disk at the left hand side of FIG. 8) provides value within the context of converting a typically modulated optical signal into an electrical signal. Thus, an electro-optic structure in accordance with the embodiments and generally in accordance with the electro-optic structure of FIG. 2 may be used to either: (1) introduce an electrical signal at an actuator electrode to modulate an optical signal within the waveguide; or (2) introduce a modulated optical signal within the waveguide to provide an electrical signal at the actuator electrode.

9. Simulation Results of Opto-Acoustic Oscillator

Analytical and numerical models of the four components of the opto-acoustic oscillator as illustrated in FIG. 1 (i.e., acousto-optic modulator, optical delay line, photodetector and amplifier) were developed in Simulink software and a transient simulation was undertaken to characterize the performance of the opto-acoustic oscillator of FIG. 1. Since the mechanical filter had a mechanical input and output, its transfer function was normalized to unity at resonance. The radio frequency signal was removed using a time-varying electrostatic capacitor at the MEMS filter, thereby not directly affecting the opto-acoustic oscillator.

Figure 10:
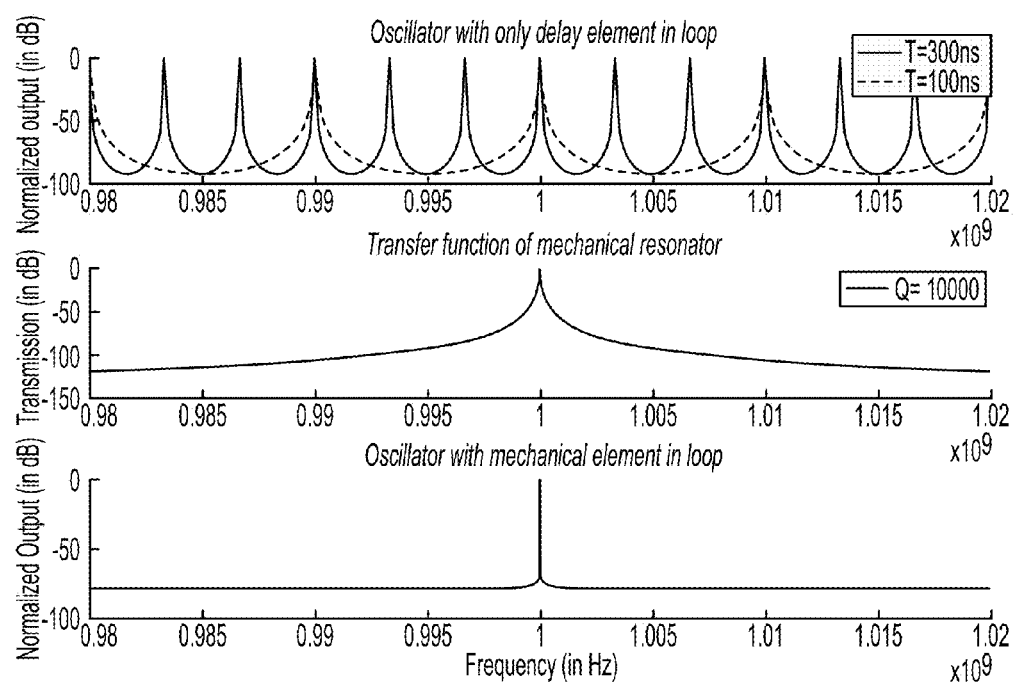
FIG. 10 shows a plurality of graphs illustrating simulated performance characteristics of an opto-acoustic oscillator with and without an acousto-optic modulator device in accordance with the first embodiment.

Results of the foregoing simulation experiments are shown in the graphs of FIG. 10, which illustrate simulated normalized output or transmission of the opto-acoustic oscillator of FIG. 1 as a function of frequency, with and without the mechanical element in the oscillator loop.

II. Second Embodiment

1. Disk Resonator Based Modulator

Figure 11:
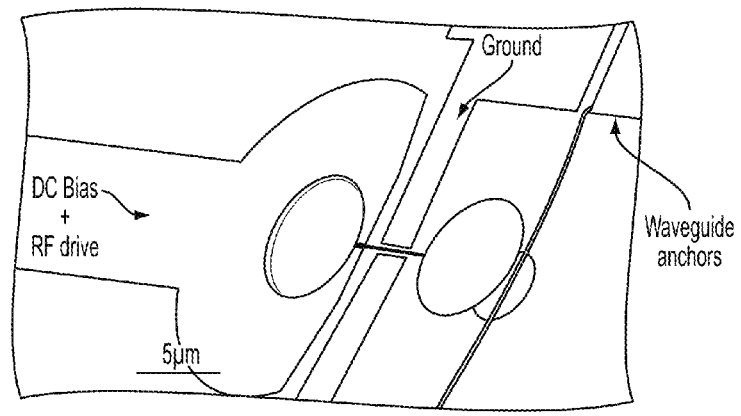
FIG. 11 shows a scanning electron microscopy image of a disk based acousto-optic modulator structure in accordance with a second embodiment.

To obtain higher mechanical frequencies closer to a GHz disk resonators are scaled to a smaller radius of 3.8 μm (i.e., a range from about 1 μm to about 4 μm) compared to the 10 μm radius used for the foregoing first embodiment 236 MHz demonstration. FIG. 11 shows a scanning electron microscopy (SEM) image of this smaller disk based optical modulator.

Figure 12:
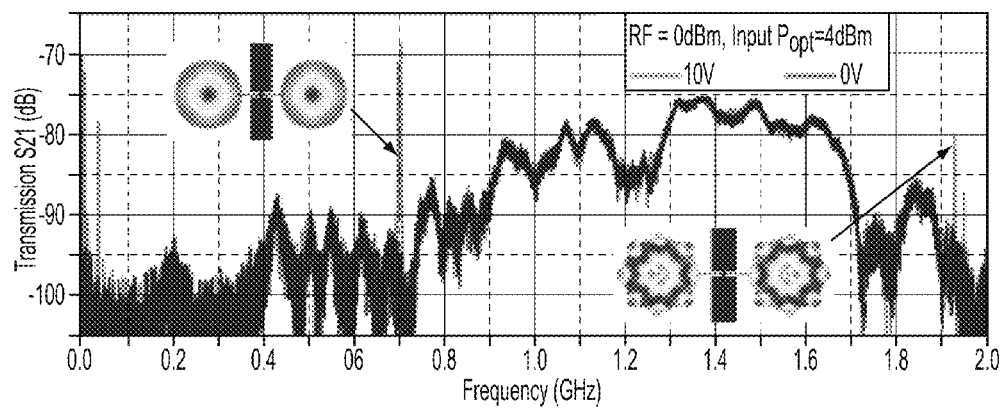
FIG. 12 shows a Transmission versus Frequency spectrum of the disk based acousto-optic modulator device in accordance with the second embodiment.

The vibrational motion in the mechanical resonator is driven by the air gap capacitive actuators surrounding the mechanical resonator disk (and separated from the mechanical resonator disk by similar or other operational dimensions as described above within the context of the first embodiment) and the optomechanical disk resonator converts these vibrations to an optical intensity modulation at the output of the waveguide (which is separated from the optomechanical resonator disk by similar or other operational dimensions as described above within the context of the first embodiment). In order to reduce anchor loss and obtain high mechanical quality factors, a balanced (i.e., see-saw) anchor scheme was used. In this scheme, the anchor was connected at the nodal point of the coupling beam interposed between the two movably but rigidly connected resonator disks. The anchor has a length from about 3.0 to about 4.0 microns that separates the two resonator disks, and a width from about 0.03 to about 0.04 microns. On observing the optical transmission spectrum through the waveguides, an optical resonance with an optical quality factor of 5,500 was obtained. Light from a tunable laser with wavelength corresponding to the half maximum point of the optical resonance was input to the waveguide to measure the electro-optic response. The light at the output of the waveguide was sent to a photodiode whose electrical output was connected to port 2 of a network analyzer. RF output from port 1 along with a DC bias was applied to the electrodes surrounding the mechanical resonator. The electro-optic response as is illustrated in FIG. 12 was measured as the transmission spectrum (S21) on the network analyzer shows the fundamental mode at a frequency of 706 MHz with a mechanical quality factor in air of 2,600 and the second order radial mode at 1.93 GHz. The insertion losses obtained were too high to obtain an oscillator by closing the loop. The high insertion loss was due to two reasons, the first being small capacitive actuator area of the small disk. The mechanical force applied by the electrostatic actuator for a given potential is proportional to the capacitor area. This implies that a smaller area corresponds to smaller displacement amplitude. The second factor is reduced displacement sensitivity due to low optical quality factor of 5,500. The low optical quality factor can be attributed to increased optical radiation losses as the light travels around the smaller optomechanical disk resonator. Additionally, the coupling beam width between the resonators is comparable to the disk dimensions and has an adverse effect on the optical mode quality factor.

2. Ring Resonator Based Modulator

Figure 13:
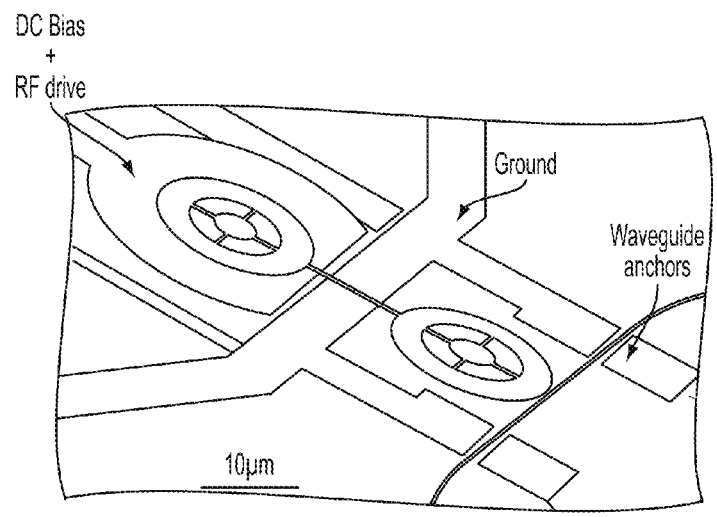
FIG. 13 shows a scanning electron microscopy image of a ring based acousto-optic modulator device in accordance with the second embodiment.

An alternate scheme for obtaining high frequency resonators without reducing the size of resonators is to use higher order mode ring resonators. The second order radial mode of a ring resonator is set mainly by the width of the ring with little dependence on the radius of the ring This allows access to GHz frequencies using the second order modes without a need for scaling the radius. A SEM image of the ring resonator modulator structure is shown in FIG. 13. The inner radius of the ring resonator is 5.7 μm (i.e., generally in a range from about 4.5 to about 7.0 μm and the width of the ring is 3.8 μm (i.e., generally in a range from about 3.0 to about 4.5 μm).

Figure 14:
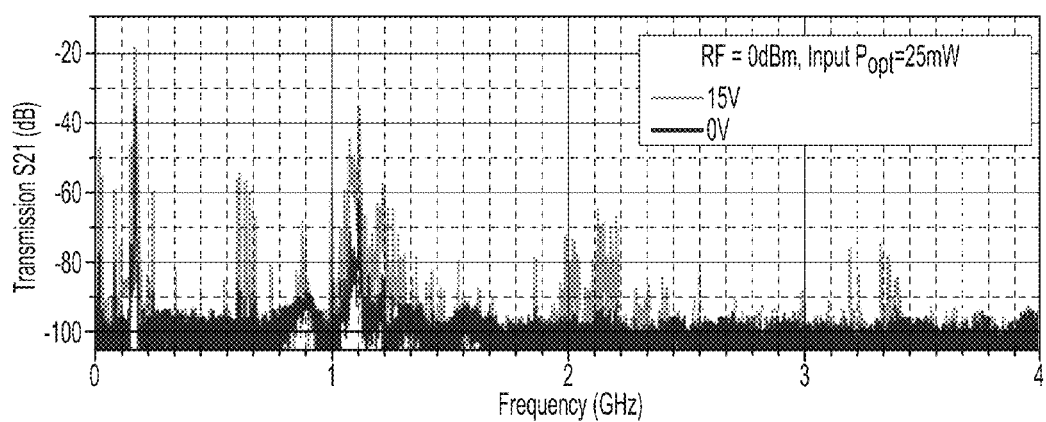
FIG. 14 shows a Transmission versus Frequency spectrum of the ring based acousto-optic modulator device in accordance with the second embodiment.

The optical resonance observed for the rings had a quality factor of ~45,000 due to the relatively larger radius. The larger size also ensures a large capacitive actuation area which gives rise to a larger force, larger displacements and thereby higher optical modulation at the output. FIG. 14 shows the electro optic response obtained for the ring resonator based modulator. Multiple mechanical resonances up to 3.5 GHz are observed in the electro optic response of the device as shown in FIG. 14. The first order radial mode is at 176 MHz while the second order radial mode was obtained around 1.12 GHz. The mechanical quality factor of the mode at 176 MHz in air was 1,000 while the second order mode at 1.12 GHz had a quality factor of 2,500 in air.

3. 1.12 GHz Oscillator

Figure 15:
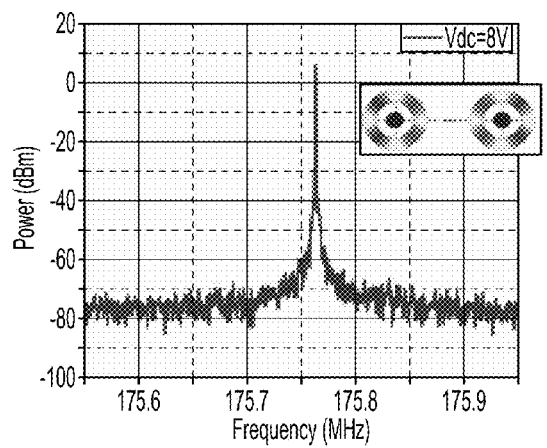
FIG. 15 shows a Power versus Frequency output spectrum of an opto acoustic oscillator including a ring based acousto-optic modulator device in accordance with the second embodiment at 175.8 MHz resonance.

The electrical output from the photodiode was fed back as the electrical input into the mechanical resonator to obtain an oscillator. For oscillations to start the unity gain condition was met by using an amplifier to compensate for the losses in the loop. A phase shifter was used to ensure that the phase around the loop is a multiple of 2π. From the electro optic response, it was seen that the insertion loss was lower for the fundamental mode at 175.76 MHz. On using a broadband amplifier, the gain condition was satisfied first at the fundamental resonance frequency of 175.76 MHz. This oscillator output as seen on the spectrum analyzer was shown in FIG. 15 along with the expected mode shape obtained from COMSOL FEM simulations.

Figure 16:
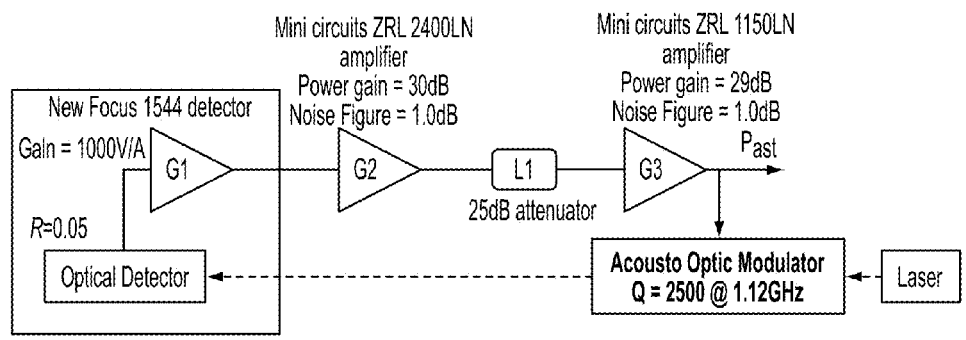
FIG. 16 shows a schematic diagram of 1.12 GHz opto acoustic oscillator loop circuit in accordance with the second embodiment.
Figure 17:
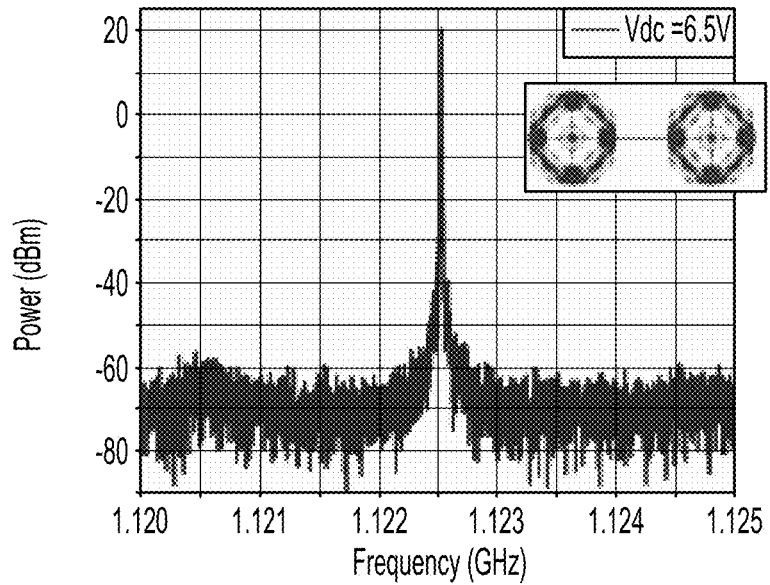
FIG. 17 shows a Power versus Frequency output spectrum of an opto acoustic oscillator including a ring based acousto-optic modulator device in accordance with the second embodiment at 1.12 GHz resonance.

To get the loop to oscillate at the frequency of the second order mode at 1.12 GHz where the insertion loss is higher, an experimental apparatus as shown in FIG. 16 was used. A combination of available amplifiers and attenuator was used to obtain the required narrowband response with the necessary gain. An attenuator was used to limit the gain as the combination of the amplifiers can provide excess RF power which could damage the modulator. The bandwidth of the amplifiers used was such that the gain condition was satisfied at 1.12 GHz before the fundamental frequency. The oscillator output observed on the spectrum analyzer is shown in FIG. 17. The RF power at the oscillator output can be varied by using the optical input power and the DC bias and is found to vary between 5 dBm and 15 dBm.

4. Phase Noise

Figure 18:
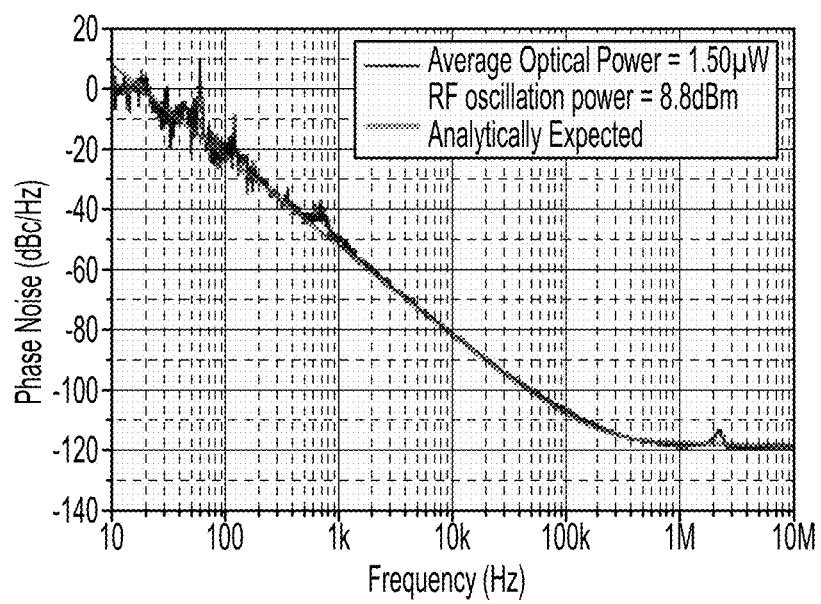
FIG. 18 shows a graph of Phase Noise versus Frequency, both measured and analytically expected, for a 1.12 GHz opto acoustic oscillator in accordance with the second embodiment.

The phase noise of the oscillator at 1.12 GHz is measured using an Agilent 505 Signal source analyzer. The measured phase noise of the 1.12 GHz oscillator at an oscillation power of 8.8 dBm is shown in FIG. 18. The phase noise was modeled by evaluating the noise added in the loop by the different components as shown in FIG. 16. As the resonator is the only frequency selection element the oscillator can be modeled using the Leeson's noise model. The phase noise of the oscillator is given by $$S_\Phi(f) = \left(1 + \frac{1}{f^2}\left(\frac{v_0}{2Q_{mech}}\right)^2\right)S_\psi(f) \qquad (7)$$

where $S(f)\Phi$ is the phase noise power spectral density at the oscillator output, f is the frequency offset from the oscillator frequency $v_0$, $S(f)\psi$ is the phase noise power spectral density of the components forming the oscillator loop and $Q_{mech}$ is the mechanical quality factor. $S(f)\psi$ includes the white noise at the detector, white noise and flicker noise of the amplifier. The Leeson frequency is specified by $(v_0/2Q_{mech})$ and represents the offset frequency beyond which the phase noise power spectral density shows white noise behavior. The expected Leeson frequency for the 1.12 GHz oscillator with a mechanical quality factor of 2,500 is 224 MHz. This predicted value corresponds well with the measured phase noise corner frequency as shown in FIG. 18. For offset frequencies below the Leeson frequency, the measured phase noise shows a $1/f^3$ behavior which suggests that the flicker phase noise corner frequency of the amplifier is close to the Leeson frequency.

The foregoing embodiments are illustrative rather than limiting. To that end, revisions and modifications may be made to methods, materials, structures and dimensions of an electro-optic structure such as an acousto-optic modulator structure or related method in accordance with the embodiments while still providing an electro-optic structure, such as an acousto-optic modulator and related method in accordance with the invention, further in accordance with the accompanying claims.

As is understood by a person skilled in the art, within the context of the above disclosure, all references, including publications, patent applications and patents cited herein are hereby incorporated by reference in their entireties to the extent allowed, and to the same extent as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is some other element intervening.

The recitation of ranges of values herein is merely intended to serve as an efficient method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise indicated.

No language in the specification should be construed as indicating any non-claimed element as essential to the practice of the invention.

It will be thus further apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electro-optic structure comprising:
at least one substrate;
a plurality of rigidly connected resonator core components that are rigidly mechanically connected and fixed with respect to each other, and also located movably suspended at least in part over the at least one substrate and anchored to the at least one substrate at an anchor point;
at least one actuator electrode located over the substrate and operatively spaced from a first one of the plurality of rigidly connected resonator core components; and
a waveguide located over the at least one substrate and operatively spaced from a second one of the plurality of rigidly connected resonator core components.

2. The electro-optic structure of claim 1 wherein the substrate comprises a semiconductor-on-insulator substrate.

3. The electro-optic structure of claim 1 wherein the plurality of rigidly connected resonator core components is selected from the group consisting of a circular disk or a circular ring, an elliptical disk or an elliptical ring, a regular or irregular polygonal disk or ring, an alternative regular or irregular disk or ring shape, or a linear resonator cavity formed by Bragg reflectors.

4. The electro-optic structure of claim 1 wherein the anchor point is at one end of the plurality of rigidly connected resonator core components.

5. The electro-optic structure of claim 1 wherein the actuator electrode comprises a radio frequency and direct current actuator electrode.

6. The electro-optic structure of claim 1 wherein the waveguide comprises an optical waveguide.

7. The electro-optic structure of claim 1 wherein the electro-optic structure comprises an acousto-optic modulator structure.

8. An opto-acoustic oscillator including the acousto-optic modulator structure of claim 7.

9. The electro-optic structure of claim 1 wherein:
the first one of the plurality of rigidly connected resonator core components and the at least one actuator electrode comprise a doped monocrystalline silicon material; and
the second one of the plurality of rigidly connected resonator core components and the waveguide comprise an undoped monocrystalline silicon material.

10. The electro-optic structure of claim 1 wherein the plurality of rigidly connected resonator core components is coplanar and linearly connected with respect to the anchor point.

11. The electro-optic structure of claim 1 wherein the plurality of rigidly connected resonator core components is:
mechanically connected and fixed with respect to each other with at least one connecting beam; and
mechanically connected and movably suspended over the substrate with at least one terminal beam that is coplanar with the plurality of rigidly connected resonator core components and spaces the plurality of rigidly connected resonator core components from the anchor point by about 1.5 to about 10 microns.

12. The electro-optic structure of claim 1 wherein the plurality of rigidly connected resonator core components is separated from the substrate by a distance from about 1 to about 3 microns.

13. The electro-optic structure of claim 1 wherein each of the plurality of rigidly connected resonator core components has a radius from about 5 to about 30 microns.

14. The electro-optic structure of claim 13 wherein the at least one actuator electrode is operatively spaced from the first one of the plurality of connected disks by a distance from about 50 to about 250 nanometers.

15. The electro-optic structure claim 13 wherein the optical waveguide has a linewidth from about 300 to about 500 nanometers and is operatively spaced from the second disk by a distance from about 50 to about 400 nanometers.

16. The electro-optic structure of claim 1 wherein each of the plurality of rigidly connected resonator core components has a radius from about 1 to about 4 microns.

17. The electro-optic structure of claim 1 wherein:
the plurality of rigidly connected resonator core components comprises at least three rigidly connected resonator core components that are rigidly mechanically connected and fixed with respect to each other, and also located movably suspended at least in-part over the substrate and anchored to the substrate at an anchor point;
the at least one actuator electrode is located over the at least one substrate and operatively spaced from a first one of the plurality of rigidly connected resonator core components;

the waveguide is located over the substrate and operatively spaced from a second one of the plurality of rigidly connected resonator core components; and a second waveguide is located over the substrate and operatively spaced from a third one of the plurality of rigidly connected resonator core components, where the first one of the plurality of rigidly connected resonator core components is interposed between the second one of the plurality of rigidly connected resonator core components and the third one of the plurality of rigidly connected resonator core components.

18. The electro-optic structure of claim 17 wherein the anchor point is interposed between the plurality of rigidly connected resonator core components.

19. The electro-optic structure of claim 17 wherein the electro-optic structure comprises an acousto-optic modulator integrated with a radiation pressure driven detector.

20. An opto-acoustic oscillator that includes the acousto-optic modulator integrated with the radiation pressure driven detector of claim 19.

21. The electro-optic structure of claim 17 wherein the plurality of rigidly connected resonator core components is:
mechanically connected and fixed with respect to each other with at least one connecting beam; and
mechanically connected and movably suspended over the substrate with at least one terminal beam that is coplanar with the plurality of rigidly connected resonator core components and spaces the plurality of rigidly connected resonator core components from the anchor point by about 1.5 to about 10 microns.

22. A method for operating an electro-optic device comprising:
providing an electro-optic structure comprising:
at least one substrate;
a plurality of rigidly connected resonator core components that are rigidly mechanically connected and fixed with respect to each other, and also located movably suspended at least in part over the substrate and anchored to the substrate at an anchor point;
at least one actuator electrode located over the at least one substrate and operatively spaced from a first one of the plurality of rigidly connected resonator core components; and
a waveguide located over the substrate and operatively spaced from a second one of the rigidly connected resonator core components; and
introducing an electrical signal at the at least one actuator electrode to modulate an optical signal within the waveguide.

23. The method of claim 22 wherein:
the electrical signal is transduced to a mechanical signal at the first one of the rigidly connected resonator core components; and
the mechanical signal is transduced to an optical signal at the second one of the rigidly connected resonator core components.

24. The method of claim 22 wherein the plurality of rigidly connected resonator core components is:
mechanically connected and fixed with respect to each other with at least one connecting beam; and
mechanically connected and movably suspended over the substrate with at least one terminal beam that is coplanar with the plurality of rigidly connected resonator core components and spaces the plurality of rigidly connected resonator core components from the anchor point by about 1.5 to about 10 microns.

25. A method for operating an electro-optic device comprising:
providing an electro-optic structure comprising:
at least one substrate;
a plurality of rigidly connected resonator components located movably suspended at least in part over the at least one substrate and anchored to the at least one substrate at an anchor point;
at least one actuator electrode located over the at least one substrate and operatively spaced from a first one of the plurality of rigidly connected resonator components; and
a waveguide located over the substrate and operatively spaced from a second one of the rigidly connected resonator components;
introducing an optical signal within the waveguide to generate an electrical signal at the at least one actuator electrode.

26. The method of claim 25 wherein the optical signal is a modulated optical signal.

27. The method of claim 25 wherein:
the optical signal is transduced to a mechanical signal at the second one of the rigidly connected resonator core components; and
the mechanical signal is transduced to an electrical signal at the first one of the rigidly connected resonator core components.

28. The method of claim 25 wherein the plurality of rigidly connected resonator core components is:
mechanically connected and fixed with respect to each other with at least one connecting beam; and
mechanically connected and movably suspended over the substrate with at least one terminal beam that is coplanar with the plurality of rigidly connected resonator core components and spaces the plurality of rigidly connected resonator core components from the anchor point by about 1.5 to about 10 microns.

29. A method for fabricating an electro-optic structure comprising:
forming over at least one substrate a plurality of rigidly connected resonator core components that are rigidly mechanically connected and fixed with respect to each other, and also located movably suspended at least in part over the at least one substrate and anchored to the at least one substrate at an anchor point;
forming over the at least one substrate at least one actuator electrode located over the at least one substrate and operatively spaced from a first one of the plurality of rigidly connected resonator core components; and
forming over the at least one substrate a waveguide located over the at least one substrate and operatively spaced from a second one of the plurality of rigidly connected resonator core components.

30. The method of claim 29 wherein:
a surface semiconductor layer within a silicon-on-insulator substrate is subjected to patterning to form upon a buried oxide layer the plurality of rigidly connected resonator core components, the actuator electrode operatively separated from the first one of the plurality of rigidly connected resonator core components and the optical waveguide separated from the second one of the plurality of rigidly connected resonator core components; and
portions of the buried oxide layer are subjected to etching to provide the plurality of rigidly connected resonator core components movably separated from and suspended at least in-part over the substrate, but anchored to the substrate.

31. The method of claim 30 wherein the plurality of rigidly connected resonator core components comprises at least two rigidly connected resonator core components.

32. The method of claim 30 wherein the plurality of rigidly connected resonator core components comprises at least three rigidly connected resonator core components.

33. The method of claim 30 further comprising doping at least the actuator electrode.

34. The method of claim 33 wherein:
the patterning uses a first mask;
the doping uses a second mask; and
the etching uses a third mask.

35. The method of claim 30 wherein the patterning uses an anisotropic etch method and the etching uses an isotropic etch method.

36. The method of claim 30 wherein the plurality of rigidly connected resonator core components is:
mechanically connected and fixed with respect to each other with at least one connecting beam; and
mechanically connected and movably suspended over the substrate with at least one terminal beam that is coplanar with the plurality of rigidly connected resonator core components and spaces the plurality of rigidly connected resonator core components from the anchor point by about 1.5 to about 10 microns.

* * * * *